United States Patent
Nichols et al.

(10) Patent No.: US 6,730,143 B1
(45) Date of Patent: May 4, 2004

(54) TRUCK AIR DRYER PURGE AIR CLEANER

(75) Inventors: Randall W. Nichols, Westlake, OH (US); Jeff Malarik, Independence, OH (US)

(73) Assignee: Bendix Commercial Vehicle Systems, LLC

( * ) Notice: Subject to any disclaimer, the term of this patent is extended or adjusted under 35 U.S.C. 154(b) by 0 days.

(21) Appl. No.: 10/256,813

(22) Filed: Nov. 18, 2002

(51) Int. Cl.[7] .......................... B01D 53/04; B01D 53/26
(52) U.S. Cl. .............................. 95/118; 95/143; 98/135
(58) Field of Search ........................... 55/385, 3, 421, 55/429, DIG. 17; 95/117, 118, 122; 96/134–137, 140–144, 147, 149

(56) References Cited

U.S. PATENT DOCUMENTS

| | | | | |
|---|---|---|---|---|
| 1,423,412 A | * | 7/1922 | Garner | 55/329 |
| 1,464,741 A | * | 8/1923 | Bennett | 55/325 |
| 2,036,106 A | * | 3/1936 | Stuard | 137/204 |
| 2,508,015 A | * | 5/1950 | Dexter | 55/421 |
| 2,970,669 A | * | 2/1961 | Bergson | 96/139 |
| 3,214,054 A | * | 10/1965 | Poethig et al. | 220/240 |
| 3,318,323 A | * | 5/1967 | Pearson | 137/195 |
| 3,364,658 A | * | 1/1968 | Walker | 55/309 |
| 3,378,993 A | * | 4/1968 | Veres et al. | 96/409 |
| 3,418,789 A | * | 12/1968 | Hoffman et al. | 96/409 |
| 4,848,989 A | * | 7/1989 | Maeda | 55/319 |
| 5,002,593 A | * | 3/1991 | Ichishita et al. | 96/137 |
| 5,286,283 A | * | 2/1994 | Goodell | 96/113 |
| 5,385,592 A | * | 1/1995 | Maeda | 55/323 |
| 5,427,609 A | * | 6/1995 | Zoglman et al. | 95/98 |
| 5,595,588 A | * | 1/1997 | Blevins | 96/108 |
| 5,607,500 A | * | 3/1997 | Shamine et al. | 96/144 |
| 5,622,544 A | * | 4/1997 | Shamine et al. | 96/134 |
| 5,888,259 A | * | 3/1999 | Maeda | 55/323 |
| 6,071,321 A | * | 6/2000 | Trapp et al. | 55/318 |
| 6,074,462 A | * | 6/2000 | Quinn et al. | 96/113 |
| 6,076,272 A | * | 6/2000 | Conklin et al. | 34/80 |
| 6,391,098 B1 | * | 5/2002 | Thomas | 96/111 |

FOREIGN PATENT DOCUMENTS

EP          0277769 A1  *  8/1988

* cited by examiner

*Primary Examiner*—Robert H. Spitzer
(74) *Attorney, Agent, or Firm*—Calfee, Halter & Griswold LLP

(57) ABSTRACT

Oil entrained in purge air from a vehicle air dryer is directed through a purge air cleaner to remove the oil before discharge of the purge air to the environment. An absorbent material, perferably hydrophobic, is enclosed in the purge air cleaner, which may be safely disposed. Alternatively, oil can be extracted from the absorbent media and thereby recycled. By providing a spin-on type canister, the absorbent media can be easily replaced and serviced.

25 Claims, 4 Drawing Sheets

TRUCK AIR DRYER PURGE AIR CLEANER

BACKGROUND OF THE INVENTION

This invention relates to an air dryer assembly for a compressed air system, such as a compressed air braking system for commercial vehicles, and more specifically to an air dryer with a purge air cleaning cartridge.

Commercial vehicles such as trucks, buses, and large commercial vehicles are typically equipped with a compressed air braking system in which the brakes of the vehicle are actuated by compressed air. An air compressor is operated by the vehicle engine and storage reservoirs maintain a quantity of pressurized air for the brakes and other compressed air uses. Moisture and oil are two attendant problems associated with compressed air systems and are particularly problems that can adversely affect brake system operation.

As a result, an air dryer is incorporated into the compressed air system, and likewise an oil filter. The oil filter is able to remove coalesced oil while the air dryer is effective at removing moisture and oil vapor. Typically, the compressed air passes through a porous material to collect or coalesce the oil before the compressed air passes through a desiccant material that adsorbs or removes moisture from the compressed air. The desiccant material is periodically purged of its moisture content by a reverse or purge flow of air from a segregated purge volume through the desiccant material. During normal operation of these pressure swing absorption air dryers, small quantities of water and oil are expelled with the purge air upon each purge cycle. Water that condenses in the air line and is captured by the desiccant and oil present from bypass lubrication in the air compressor cylinders are expelled to atmosphere and the road surface. Oil on a road surface creates a traction hazard during wet weather and is not environmentally favorable. Likewise, since engine oil is used for compressor lubrication, the air dryer purge is an environmental release point for engine oil contaminated with heavy metals.

In known air dryer systems, the desiccant is periodically replaced. "Spin-on" type of canisters or cartridges are particularly desirable since they facilitate maintenance and replacement. In this manner, a desiccant canister is easily removed and substituted with a new canister.

Accordingly, a need exists for a design that addresses the discharge of oil to the environment, and still maintains the ease of maintenance and does not otherwise adversely impact on the operation of the air dryer assembly.

BRIEF SUMMARY OF THE INVENTION

A method and apparatus for cleaning purge air from a compressed air system prior to discharging the air to the environment is provided. In one embodiment, the apparatus is an air dryer which includes a housing having an inlet and outlet that communicate with a cavity having a desiccant material therein. A purge reservoir operatively communicates with the desiccant material cavity for receiving a flow of air purging the desiccant material of moisture before it is introduced to atmosphere. In one embodiment, an oil absorbent cartridge is in communication with the purge valve outlet of the air dryer and includes an absorbent material for removing oil from the air purging the desiccant material.

Another aspect of the present invention is a method of collecting oil from a flow of air purging the desiccant material of an air dryer. In one embodiment, the method includes purging an air dryer with a purge air flow and separating oil from the purge air flow prior to discharging the purge air flow to atmosphere. An optional additional aspect of the method includes recycling the oil collected in the oil absorbent cartridge that is affixed to the purge valve outlet of the air dyer.

DETAILED DESCRIPTION

Figure 1:
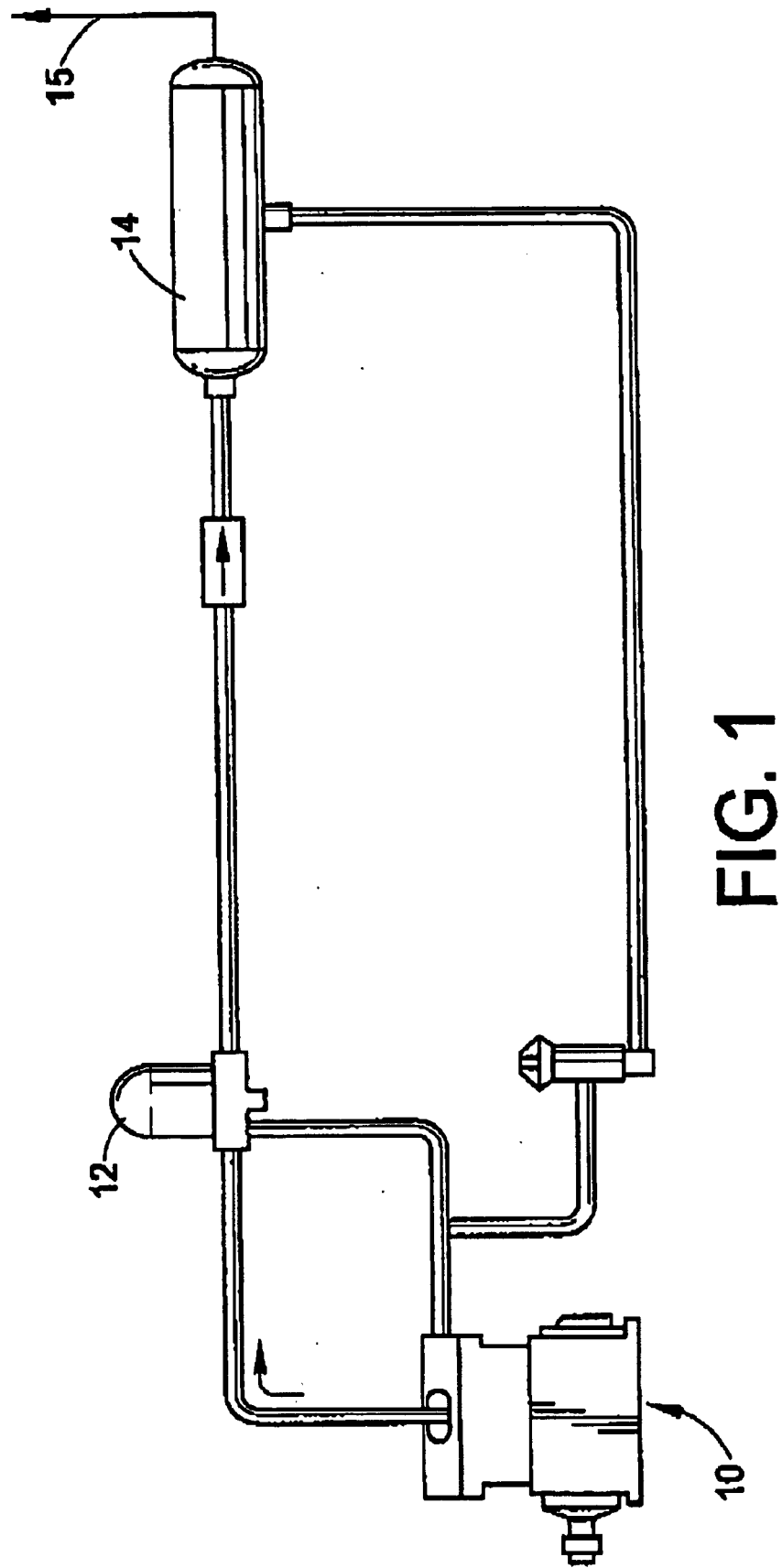
FIG. 1 is a schematic representation of major components of a compressed air system.

FIG. 1 illustrates a compressed air system of the type used, for example in a heavy truck brake system. Although the detailed description of this invention describes the invention in specific relation to a compressed air system used in a heavy truck brake system, one skilled in the art should appreciate that the scope of this invention includes compressed air systems used in other vehicles, as well as compressed air systems in general. An air compressor 10 is driven by a vehicle engine (not shown) in a conventional manner. Pressurized air exits the compressor and passes through an air dryer assembly 12. Moisture, oil and other contaminants are usually removed from the pressurized air before it is stored in reservoirs 14 or distributed to a downstream use, such as air brakes, and bulk offloading equipment, for example, as represented by reference numeral 15.

Figure 2:
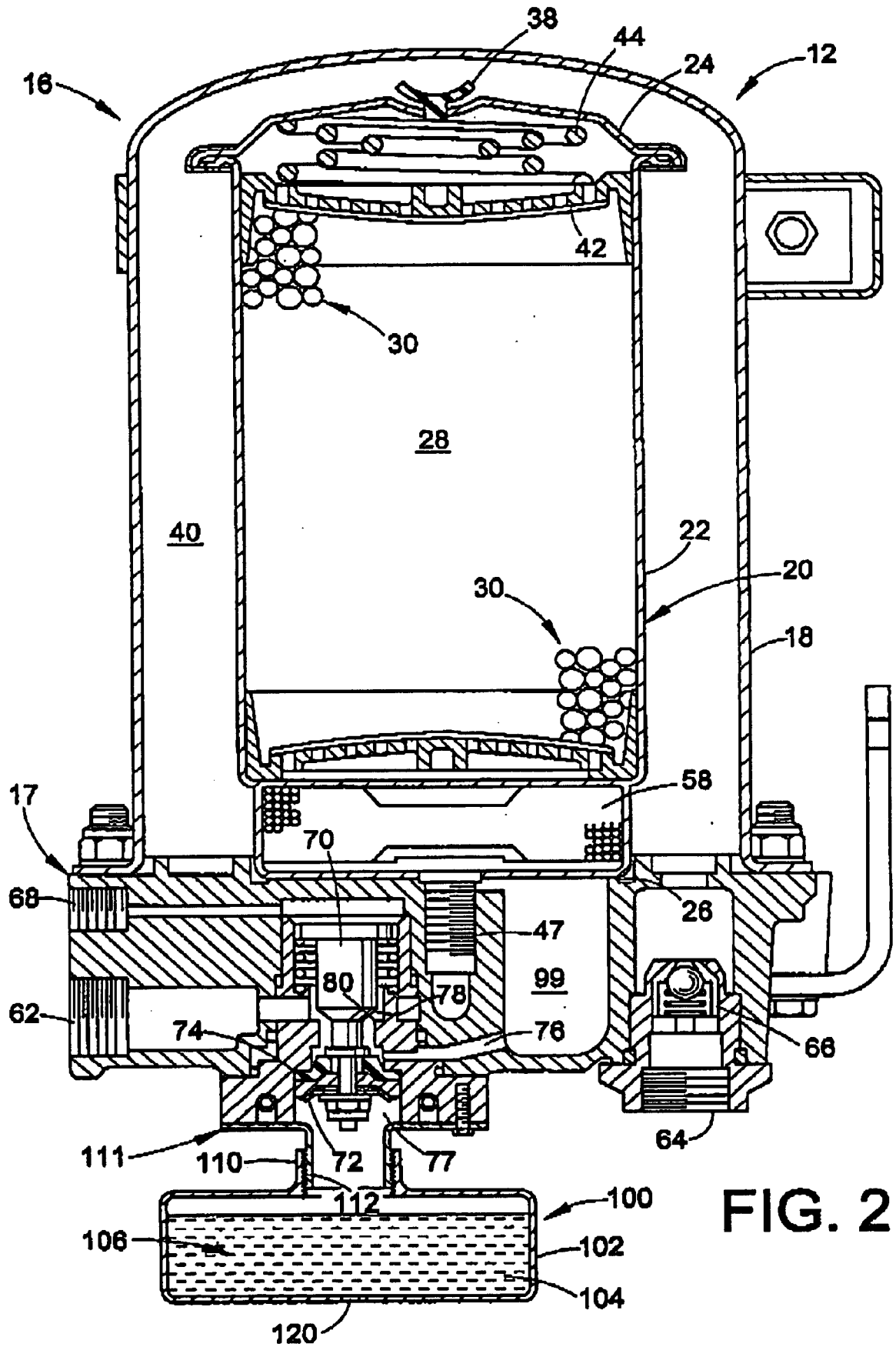
FIG. 2 is a cross-sectional illustration of an air dryer assembly incorporating an oil absorbent cartridge.
Figure 3:
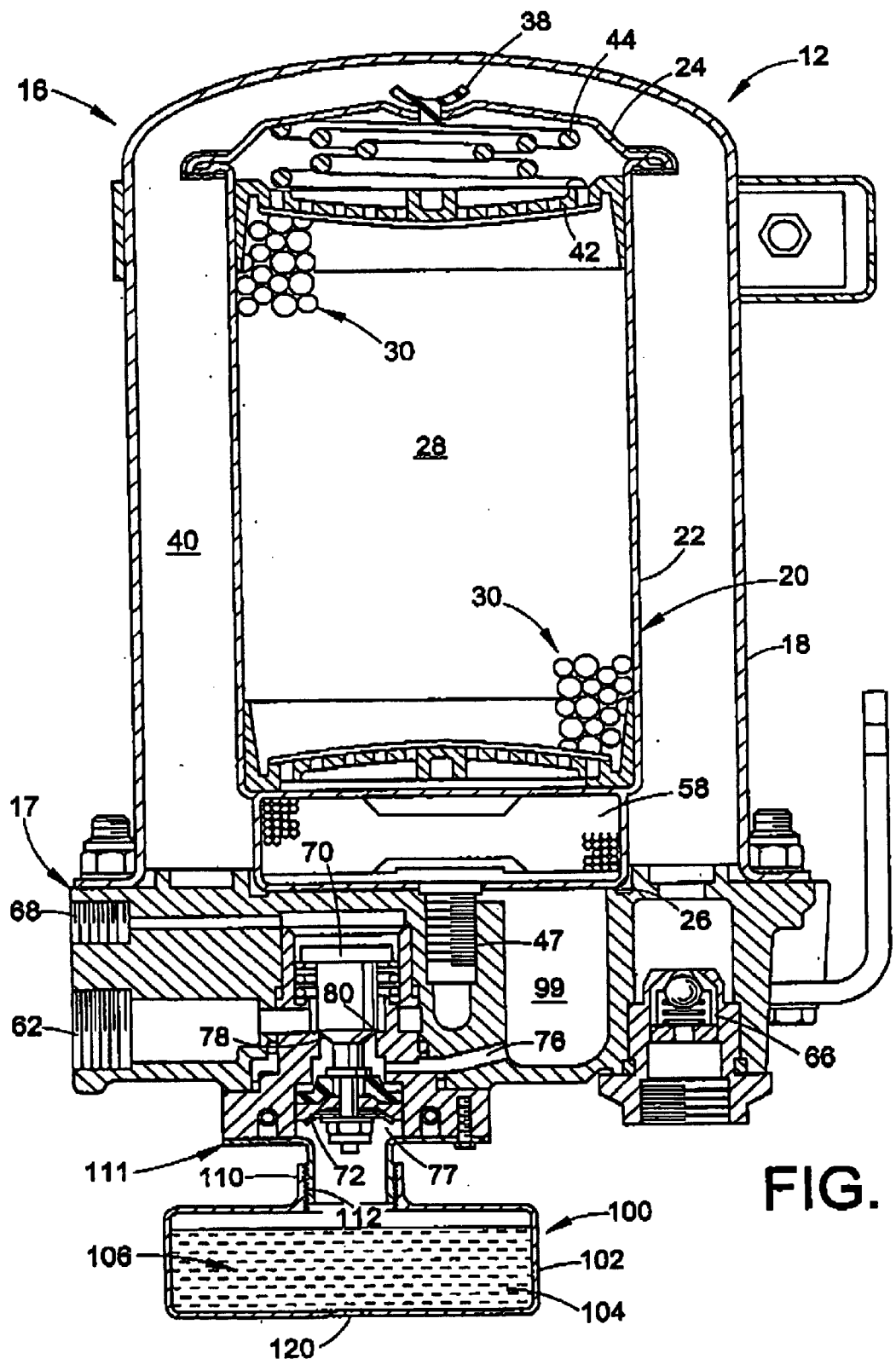
FIG. 3 is a cross-sectional illustration of an air dryer assembly incorporating an oil absorbent cartridge wherein the purge valve is in the actuated position.
Figure 4:
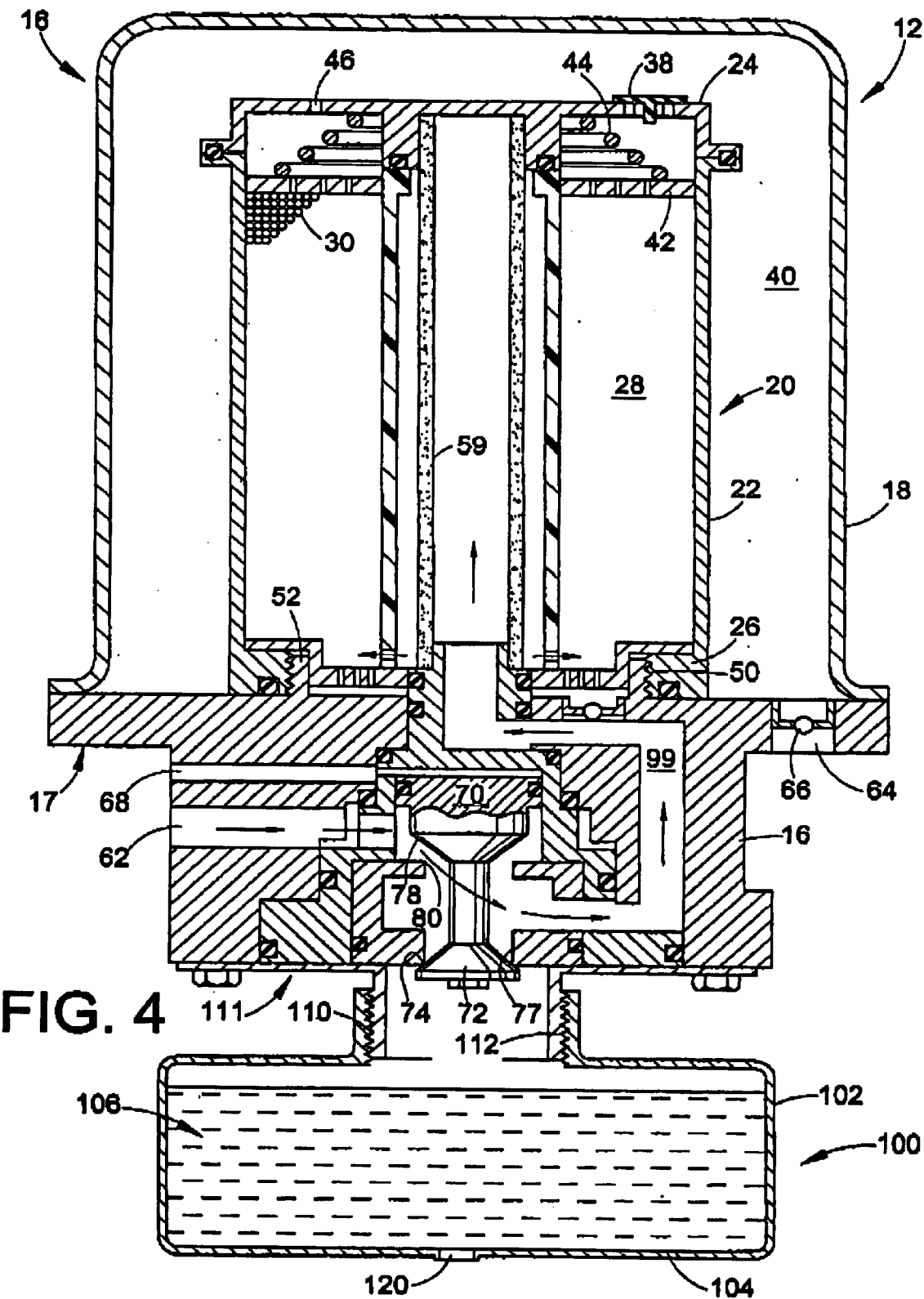
FIG. 4 is a cross-sectional illustration of a different air dryer assembly incorporating the oil absorbent cartridge of the present invention.

FIGS. 2–4 illustrate that the air dryer 12 includes a housing 16 secured to a base 17. More particularly, a cover 18 closes the replacement desiccant canister 20 that includes a generally circumferential wall 22, end wall 24, and a second end wall 26. A desiccant bed 28 includes a beaded desiccant material, a portion of which is illustrated at 30. The desiccant material 30 removes moisture and may remove oil and other contaminants from the pressurized air. Check valve 38 allows compressed air out of the desiccant bed and into a surrounding purge volume 40 defined between housing 16 and circumferential wall 22. A perforated plate 42 is disposed in the desiccant bed 28 and spring 44 maintains pressure on the plate so that the desiccant beads are loaded to inhibit relative movement among the beads. As shown in FIG. 4, the end wall 24 may further include a flow restricting orifice 46 that permits restrictive flow of compressed air from the purge volume 40 into the desiccant bed when the pressure in the desiccant bed drops below a predetermined level.

Desiccant canister 20 is secured to the housing base plate 17 along wall 22 either by the bolt 47 as shown in FIGS. 2 and 3, a set of corresponding threads 50 and 52 as shown in FIG. 4, or by some other conventional fastening means. In this manner, the desiccant canister can be installed and removed relative to the base by engaging or disengaging the threads 50 and 52 or the bolt 47.

The air dyer assembly 12 may include an oil coalescing element such as the coalescing oil filters 58 or 59 shown in FIGS. 3 and 4 respectively.

A supply air inlet port 62 communicates with the air compressor 10. Delivery port 64, on the other hand communicates with reservoir 14 and is controlled by check valve 66. A control port 68 provides a pressure control signal indicative when the compressor goes offload.

A purge control valve 70 is slidably mounted within the base 17. Purge control valve 70 includes an exhaust valve portion 72 that cooperates with exhaust valve seat 74 and an inlet valve portion 78 that cooperates with valve scat 80 to selectively control communication between the supply port 62 and the passage 76. The purge control valve 70 moves from a first position illustrated in FIG. 2, where the exhaust port 77 is closed and communication is permitted between supply port 62 and passage 76, to an actuated position, as illustrated in FIG. 3, in which the valve surface 78 closes against valve seat 80 to terminate communication between the supply port 62 and passage 76. This movement of the purge control valve 70 opens purge air exhaust port 77 to vent the passage 76. In the past, the purge air exhaust port 77 communicated directly with atmosphere. Additionally, oil vapor traveling through passageway 76 condenses in air reservoir 99. During the purge cycle of the air dryer 12, air passes from purge volume 40 through the air dryer and reservoir 99 and carries the condensed oil vapor out through exhaust port 77 to the environment.

A purge air cleaner 100 may be added to a conventional air dryer as a new air dyer unit or may be adapted to retrofit existing air dryer assemblies. The purge air cleaner 100 includes a housing 102 having an internal cavity 104. The cavity is filled with an absorbent material 106, shown here as a fixed bed of an absorbent material, that retains oil for either safe disposal or solvent extraction. It should be understood that an absorbent material is a material that will absorb, adsorb, retain, entrap, or otherwise remove oil from the purge flow. Preferably, the absorbent material is hydrophobic, such as melt blown polypropylene, for example, for better oil assimilation. A hydrophobic absorbent material will also reject water, thereby enhancing the oil retention capacity of the absorbent. In one embodiment, the material 106 is formed as a porous, fixed bed inside a canister or housing 102, which is connected to the air dryer purge valve 70. One skilled in the art will appreciate that other absorbent materials and configurations may be used to remove the oil entrained in the purge air flow. For example, the absorbent material 106 may be a corrugated sheet or a bed of granulated material. Likewise, other engineered shapes that channel air uniformly through the bed and enhance air contact with the absorbent can be used. Thus, purge air flow that would in the prior art have been directed to atmosphere from the purge valve 70 moved to an actuated position, in which the exhaust valve portion 72 is spaced from its associated scat 74, is directed through the canister 100. An exhaust opening 120 allows the cleaned purge air to be directed to atmosphere. The path from the purge valve 70 to the port 120 requires the purge air to flow through the absorbent material 106. Oil is thereby removed from the purge air before being discharged to the environment.

An external threaded region 110 is provided on an extending portion of a retaining member 111 associated with the air dryer 12. Likewise, internal threads 112 are provided on a neck region of the purge air cleaner 100. In this manner, the purge air cleaner can be easily assembled and removed from the remainder of the air dryer cartridge. The use of a spin-on type arrangement allows the purge air cleaner 100 to be easily removed for inspection, maintenance, or replacement.

As will be recognized, a purge air cleaner can be provided as original equipment or, in some instances, can be a retrofit arrangement. In either instance, oil is effectively removed from purge air before being discharged to surrounding environment. By using a spin-on type of cartridge, ease of replacement and substitution with a new cartridge can be attained. The entire canister can be removed and replaced by a new cartridge so that solvent extraction, safe disposal, or recycling of the oil is achieved.

It will be appreciated that the purge air cleaner may adopt a wide variety of configurations and be secured to an air dryer in a variety of manners. This invention is intended to include such modifications and alterations in so far as they fall within the scope of the appended claims or the equivalents thereof.

What is claimed is:

1. A method of recovering oil from a compressed air system that includes an air dryer having a desiccant material disposed therein, the method comprising the steps of:
   purging an air dryer with a purge air flow; and
   separating oil from the purge air flow prior to discharging the purge air flow to atmosphere.

2. The method of claim 1, wherein the step of separating oil from the purge air flow is performed by a purge sir cleaner.

3. The method of claim 2, wherein said purge air cleaner is selectively removable.

4. The method of claim 1 comprising the further step of supplying an absorbent material in a purge air cleaner to absorb the oil therein.

5. The method of claim 4, wherein said absorbent material is hydrophobic.

6. The method of claim 1 comprising the further step of recycling the oil collected in a purge air cleaner.

7. An air dryer assembly for a compressed air system comprising:
   a housing having an inlet and an outlet that communicate with a cavity having a desiccant material therein, whereby the desiccant material removes moisture from compressed air passing from the inlet to the outlet, and a purge air flow through the desiccant material removes moisture and oil therefrom; and
   a purge air cleaner in operative communication with the desiccant material for receiving the purge air flow.

8. The air dryer assembly of claim 7 wherein the purge air cleaner is mounted adjacent the housing.

9. The air dryer assembly of claim 7 further comprising a purge valve for reversing air flow through the desiccant material from the outlet to the inlet.

10. The air dryer assembly of claim 7 wherein the purge air cleaner further comprises an absorbent material therein for removing oil from the purge flow.

11. The air dryer assembly of claim 10 wherein the absorbent material is hydrophobic.

12. The air dryer assembly of claim 10 wherein the absorbent material is a porous fixed bed.

13. The air dryer assembly of claim 10 wherein said absorbent material is a corrugated sheet material housed within the purge air cleaner.

14. The air dryer assembly of claim 7 wherein the purge air cleaner is selectively removable.

15. The dr dryer assembly of claim 14 wherein the purge air cleaner further comprises a set of threads for spin-on assembly to and disassembly from said housing.

16. The air dryer assembly of claim 7 wherein the purge air cleaner further comprises a port communicating with the atmosphere.

17. An air dryer assembly for a compressed air system used on a vehicle, the air dryer assembly comprising:

an air dryer housing having a supply port and a delivery port communicating with a desiccant material stored in the housing for removing moisture and contaminants from compressed air flowing from the supply port to the delivery port;

a valve for providing a purge air flow tough the desiccant material whereby moisture and contaminants are removed form the desiccant material by the purge air; and a reservoir that receives the purge air, wherein oil in the purge air is removed.

18. The air dryer assembly of claim 17, wherein said reservoir removes oil from the purge at prior to is discharge of the purge air to atmosphere.

19. The air dryer assembly of claim 17 wherein the reservoir includes an absorbent material for removing oil from the purge flow.

20. The air dryer assembly of claim 19, wherein the absorbent material is hydrophobic.

21. The air dryer assembly of claim 17 wherein the reservoir is removably mounted to the air dryer housing.

22. A purge air cleaner connectable to an air dryer, the purge air cleaner comprising:

an inlet adapted to receive purge air from the air dryer;

an absorbent material disposed in the purge air cleaner, wherein the absorbent material removes oil from the purge air; and an outlet for discharging the purge air from the purge air cleaner.

23. The purge air cleaner of claim 22, wherein the absorbent material is hydrophobic.

24. The purge reservoir of claim 22, wherein said purge air cleaner further comprises a set of threads for engaging an air dryer assembly.

25. The purge reservoir of claim 22, wherein said purge air cleaner is connected to a commercial vehicle.

* * * * *

UNITED STATES PATENT AND TRADEMARK OFFICE
CERTIFICATE OF CORRECTION

PATENT NO.     : 6,730,143 B1
DATED          : May 4, 2004
INVENTOR(S)    : Randall W. Nichols et al.

It is certified that error appears in the above-identified patent and that said Letters Patent is hereby corrected as shown below:

<u>Column 4,</u>
Line 60, please delete "dr" and insert -- air --

<u>Column 5,</u>
Line 6, please delete "tough" and insert -- through --
Line 13, please delete "at" and insert -- air --

Signed and Sealed this

First Day of February, 2005

JON W. DUDAS
*Director of the United States Patent and Trademark Office*